United States Patent [19]

Welch

[11] 4,284,748

[45] Aug. 18, 1981

[54] OLEFIN POLYMERIZATION

[75] Inventor: Melvin B. Welch, Bartlesville, Okla.

[73] Assignee: Phillips Petroleum Company, Bartlesville, Okla.

[21] Appl. No.: 73,467

[22] Filed: Sep. 7, 1979

[51] Int. Cl.³ .......................... C08F 4/02; C08F 10/02
[52] U.S. Cl. ................................ 526/119; 252/429 C; 526/97; 526/129; 526/352
[58] Field of Search ................... 252/429 C; 526/119, 526/124, 129, 97

[56] References Cited

U.S. PATENT DOCUMENTS

| | | | |
|---|---|---|---|
| 3,701,766 | 10/1972 | Delboulle et al. | 526/129 |
| 3,769,233 | 10/1973 | Hermans et al. | 526/129 |
| 4,199,475 | 4/1980 | Welch et al. | 252/429 C |

FOREIGN PATENT DOCUMENTS 1276345  6/1972  United Kingdom ..................... 526/124

*Primary Examiner*—Edward J. Smith

[57] ABSTRACT

Polymerization of olefins in the presence of a catalyst system comprising a titanium-containing composition associated with silica and a cocatalyst comprising a metal hydride or organic metal compound derived from an element of Groups I-III of the Periodic Table.

15 Claims, No Drawings

OLEFIN POLYMERIZATION

BACKGROUND OF THE INVENTION

This invention relates to the polymerization of olefins. In another aspect, this invention relates to a novel catalyst system useful for the polymerization of α-olefins. In accordance with another aspect, this invention relates to a method of preparing a titanium-containing composition associated with silica useful as a catalyst component for the polymerization of α-olefins. In a further aspect, this invention relates to a process for the polymerization of olefins in the presence of a catalyst comprising a catalyst component which is obtained as a reaction product of a silicon-containing finely divided inorganic solid, a tetravalent titanium compound and an organometal compound of metals of Groups IIA and IIIA of the Periodic Table. In still another aspect, this invention relates to a catalyst system useful for the polymerization of olefins which comprises two components with a first component being the product of reaction between a silicon-containing compound, a tetravalent titanium compound and an organometal compound of a Group IIA or IIIA metal and combining the titanium-containing reaction product with a metallic hydride or organometallic compound, containing a metal of Groups IA, IIA and IIIA of the Periodic Table.

An object of this invention is to provide an improved process for the polymerization of olefins.

Another object of this invention is to provide a novel and improved catalyst for the polymerization of α-olefins.

A further object of this invention is to increase the yield of polymer in olefin polymerization processes.

Other objects, aspects and the several advantages of this invention will be apparent to those skilled in the art upon a study of this disclosure and the appended claims.

SUMMARY OF THE INVENTION

In accordance with the invention, the titanium-containing catalyst component (A) is prepared by the reaction between (a) a silicon-containing finely divided inorganic solid, (b) a tetravalent titanium compound and (c) an organometal compound of a metal of Groups IIA and IIIA of the Periodic Table.

Further, in accordance with the invention, a polymerization catalyst is provided comprising a titanium-containing component (A) as defined above and a cocatalyst (B) comprising a metallic hydride or organometallic compound of an element of Groups IA, IIA, and IIIA of the Periodic Table.

DETAILED DESCRIPTION OF THE INVENTION

In one embodiment, the catalyst is formed in a multi-step process comprising (a) reacting a dry particulate silica-containing base with tetravalent titanium compound, (b) contacting the product with an organometal compound of an element of Groups IIA and IIIA of the Periodic Table, and (c) treating the product of (b) with a tetravalent titanium compound. The solid final product is separated from the reaction mixture, washed with a dry hydrocarbon to remove unreacted titanium compound, and dried to obtain the catalyst component A as a solid, particulate material.

The silica-containing base used in step (a) consists of silica, silica-alumina, silica-boria, silica-thoria, silica-titania, silica-zirconia, or mixtures in which the silica content ranges from about 80 to 100 weight percent. The various silicas can be prepared conventionally, employing precipitation and coprecipitation methods of formation as well as physically mixing particulate solids of each metal oxide. The base is calcined in air at an elevated temperature such that undue decrease in the surface silanol population is not adversely affected. For a silica base itself, for example, the calcining temperature can range from about 400° C. to about 710° C. Generally, as the calcination temperature of the silica increases the activity of catalyst made from the silica also increases.

The tetravalent titanium compounds employed in step (a) are preferably titanium alkoxides in which the alkyl group of the alkoxide contains from 1 to about 12 carbon atoms. An especially preferred compound is titanium tetraisopropoxide. The tetravalent titanium compounds can be expressed as $TiX_n(OR)_{4-n}$ in which R is a hydrocarbon group containing from 1 to about 12 carbon atoms such as alkyl, cycloalkyl, aryl, and combinations such as alkaryl, X is a halogen, usually bromine or chlorine, and n is an integer of 0 to 4. Examples of suitable compounds include titanium tetrachloride, titanium tetramethoxide, titanium tetraethoxide, titanium tetraisopropoxide, titanium tetracyclohexyloxide, titanium tetraphenoxide, titanium tetrabenzyloxide, titanium chlorotrimethoxide, titanium dichlorodiethoxide, and titanium tribromo-n-butoxide, and mixtures.

The organometal compound preferably employed in step (b) is selected from among an organomagnesium compound and an organoaluminum compound or combinations thereof, preferably an organomagnesium compound.

The organomagnesium compound can be expressed as $MgR_2$ in which R can be the same or different and each is as previously described. Presently preferred compounds are dialkylmagnesium compounds in which each alkyl group contains from 1 to about 6 carbon atoms. Specific examples of suitable compounds include dimethylmagnesium, diethylmagnesium, n-butyl-sec-butylmagnesium, di-n-pentylmagnesium, didodecylmagnesium, diphenylmagnesium, dibenzylmagnesium and dicyclohexylmagnesium.

The organoaluminum compound can be expressed as $AlR_bY_{3-b}$ in which R is the same as above, Y is a monovalent radical selected from among the halogens and hydrogen, and b is an integer of 0 to 3. Examples of suitable compounds include trimethylaluminum, triethylaluminum, tridodecylaluminum, tricyclohexylaluminum, triphenylaluminum, tribenzylaluminum, diethylaluminum chloride, ethylaluminum dichloride, ethylaluminum dibromide, diisobutylaluminum hydride, and the like.

The tetravalent titanium compound used in step (c) can be the same as described in step (a). Generally, it is preferred to utilize a titanium tetrahalide, usually titanium tetrachloride because of its ready availability and efficacy in the reaction. If a liquid, the tetravalent titanium compound can be used neat. However, it is often more convenient to employ it dissolved in a dry solvent such as n-heptane to insure better contact with the step (b) product.

The mole ratio of silica to tetravalent titanium compound in step (a) can range from about 5:1 to about 100:1, preferably from about 10:1 to about 75:1.

The mole ratio of initial tetravalent titanium compound employed in step (a) to organometal compound of an element of Groups IIA and IIIA of the Periodic Table used in step (b) can range from about 0.5:1 to about 25:1, preferably from about 1:1 to about 15:1.

In step (c) the mole ratio of titanium tetrahalide to the combined moles of components of step (b) products can range from about 100 to 1 to about 1 to 1, preferably from about 10 to 1 to about 1 to 1.

Catalyst component A is prepared by mixing the silicon-containing finely divided inorganic solid with the tetravalent titanium compound under conditions which will form a titanium-containing product. Conventional methods can be used for the mixing, reacting and contacting of the various compounds with a wide variance of conditions applicable. For example, in step (a) silicon-containing compounds can be present as a slurry in a hydrocarbon such as a paraffin, e.g., normal hexane then contacted with the tetravalent titanium compound.

In carrying out the various steps of the instant process a suitable inert diluent can be used such as aliphatic or cycloaliphatic hydrocarbons such as butane, pentane, hexane, heptane, cyclohexane, methylcyclohexane, as well as aromatic hydrocarbons including benzene and toluene. Generally, any well-known inert hydrocarbon diluent can be used.

The contacting and mixing steps can be carried out generally at temperatures in the range of about $-50°$ C. to about 200° C. with the decomposition temperatures of the tetravalent titanium compounds and the other organometallic compounds determining the limits. Usually the initial contacting can be carried out advantageously at a temperature of 0° C. to about 30° C. to avoid any premature reaction. The mixing temperature generally employed, more preferably ranges from about 20° C. to about 150° C.

The length of the contacting period can vary greatly with the time period generally ranging from about ¼ to about 10 hours.

As an example in the preparation of novel catalyst component A, catalyst component A can be conveniently prepared by contacting a slurry of silica in a hydrocarbon with the tetravalent titanium compound either neat, if the titanium compound is a liquid, or, more preferably as a solution in a dry inert hydrocarbon diluent such as normal pentane, n-heptane, cyclohexane, etc. at 23° C. When mixing is completed, the reactor contents are slowly heated to the refluxing temperature of the system and maintainted at that temperature for a sufficient period of time to effect reaction. The reaction product can be cooled to about, say, 25° C. prior to addition of an organomagnesium or organoaluminum compound. The resulting mixture can be stirred then heated at about 25° C. followed by addition of the tetravalent titanium halide, for example, and this mixture refluxed for a period of time and cooled prior to recovery and washing of the particulate solid titanium-containing product material.

Catalyst component B is a metallic hydride or organometallic compound wherein said metal is selected from Groups IA, IIA and IIIA of the Periodic Table. The preferred compound to be used as component B is an organoaluminum compound which can be represented by the formula $AlR'_bY_{3-b}$ in which R' is the same or different and is a hydrocarbon radical selected from such groups as alkyl, cycloalkyl, aryl, alkaryl, aralkyl, alkenyl and the like having from 1 to about 12 carbon atoms per molecule, Y is a monovalent radical selected from among the halogens and hydrogen, and b is an integer of 0 to 3. Specific examples of organoaluminum compounds include trimethylaluminum, triethylaluminum, tridodecylaluminum, tricyclohexylaluminum, triphenylaluminum, tribenzylaluminum, diethylaluminum chloride, diisobutylaluminum hydride, ethylaluminum dibromide, and the like.

The amount of cocatalyst (component B) employed with the catalyst (component A) during polymerization can vary rather widely from about 0.02 mmole per liter reactor contents to about 10 mmole per liter reactor contents. However, particularly good results are obtained at a more preferred range of about 0.07 mmole per liter reactor contents to about 2.5 mmole per liter reactor contents.

The polymerization process can be effected in a batchwise or in a continuous fashion by employing any conventional mode of contact between the catalyst system and the monomer or monomers. Thus the monomer can be polymerized by contact with the catalyst system in solution, in suspension, or in gaseous phase at temperatures ranging from about 20°–200° C. and pressures ranging from about atmospheric to about 1,000 psia (6.9 MPa). The polymerization process can be conducted batchwise such as in a stirred reactor or continuously such as in a loop reactor under turbulent flow conditions sufficient to maintain the catalyst in suspension.

The ethylene polymers produced are normally solid ethylene homopolymers or polymers prepared by copolymerizing ethylene with at least one aliphatic 1-olefin containing from 3 to about 10 carbon atoms or a conjugated acyclic diolefin containing 4 or 5 carbon atoms. In such polymers, the ethylene content can range from about 80 to 100 mole percent. The polymers can be converted into various useful items including films, fibers, pipe, containers, and the like by employing conventional plastics fabrication equipment.

It is especially convenient when producing ethylene polymers to conduct the polymerization in the presence of a dry hydrocarbon diluent inert in the process such as isobutane, n-heptane, methylcyclohexane, benzene, and the like at a reactor temperature ranging from about 60° C. to about 110° C. and a reactor pressure ranging from about 250 to about 600 psia (1.7–4.1 MPa). In such a process, particle form polymerization, the polymer is produced as discrete solid particles suspended in the reaction medium. The polymer can be recovered, can be treated to deactivate and/or remove catalyst residues, can be stabilized with an antioxidant system, and can be dried, all as known in the art to obtain the final product. Also, molecular weight controls such as hydrogen can be employed in the reactor as is known in the art to adjust the molecular weight of the product, if desired.

Example 1, Catalyst Preparation

A series of catalysts was prepared by contacting catalytic quality particulate dried silica slurried in about 200 ml of n-hexane with the specified quantity of tetravalent titanium compound employing a 500 ml round bottom flask equipped for stirring and refluxing. Generally, the stirred mixture was refluxed about one hour, cooled to about 25° C. and the specified amount of alkyl magnesium compound added. The mixture was stirred about 30 minutes at about 25° C., the titanium tetrachloride added, the mixture was refluxed about 1 hour, cooled to about 25° C. and stirring was discontinued. The particulate solid material was recovered by decanting the mother liquor and washing the particulate solid with about 300 ml portions of n-hexane first and n-pentane second. The product was dried over a warm water bath and weighed to determine the yield.

All mixing and recovery operations were conducted in a dry box under a nitrogen or argon atmosphere.

The quantities of materials employed, calculated mole ratios, and results are given in Table I.

80° C. (or 100° C.), and the ethylene and hydrogen, if used, added.

Each run was terminated by flashing the ethylene and isobutane and hydrogen, if present, from the reactor. The polymer was then recovered, dried, and weighed to determine the yield expressed as grams.

Each polymer yield was divided by the weight of catalyst in grams to determine the calculated catalyst

TABLE I

CATALYST PREPARATION

| Cat. No. | Silica[1] Type | g | Moles | Drying Temp. °C. Hours | M(OR)$_4$[a] g | Moles | MgR$_2$[b] g | Moles | MX$_4$[c] g | Moles |
|---|---|---|---|---|---|---|---|---|---|---|
| A | 969 MS | 36 | 0.600 | 204/3 | 10.7 | 0.03764 | 0 | 0 | 51.8 | 0.273 |
| B | " | 13.9 | .232 | " | 0 | 0 | 2.35 | 0.0154 | 69.0 | .364 |
| C | 952 | 10.0 | .167 | 704/3 | 2.16 | .00676 | 0.466 | .00336 | " | " |
| D | " | 11.3 | .188 | " | 1.91 | .00672 | " | " | 9.69 | .03915 |
| E | " | 10.5 | .175 | " | " | " | " | " | 60.0 | .353 |
| F | " | 11.0 | .183 | " | 0.860 | .00303 | 0.276 | .00181 | 69.0 | .364 |
| G | " | 10.7 | .178 | " | 1.62 | .00570 | 0.264 | .00191 | " | " |
| H | " | " | " | " | " | " | 0.505 | .00331 | " | " |
| I | " | 11.3 | .188 | 538/3 | 1.67 | .00588 | 0.529 | .00347 | " | " |
| J | " | 10.9 | .182 | 371/3 | 1.62 | .00570 | 0.505 | .00331 | " | " |
| K | " | 11.1 | .185 | 204/3 | 1.67 | .00588 | 0.529 | .00347 | " | " |
| L | " | 10.6 | .177 | 704/3 | 1.33 | .00583 | 0.466 | .00336 | " | " |
| M | " | 11.8 | .197 | 871/3 | 1.72 | .00605 | 0.546 | .00358 | " | " |
| N | " | 10.8 | .180 | 704/3 | 1.62 | .00570 | 0.698 | .00504 | " | " |

| Cat. No. | Recovered Catalyst g | Color | Mole Ratios Silica M(OR)$_4$ | M(OR)$_4$ MgR$_2$ | Remark |
|---|---|---|---|---|---|
| A | 44.7 | —[d] | 16 | — | Control |
| B | 18.9 | yellow | — | — | Control[e] |
| C | 10.8 | " | 25 | 2.0 | Control[f] [j] |
| D | 13.9 | brown | 28 | 2.0 | Control[g] [j] |
| E | 12.2 | pink | 26 | 2.0 | Control[h] [j] |
| F | 12.3 | white | 60 | 1.7 | Invention |
| G | 13.0 | pink | 31 | 3.0 | Invention[j] |
| H | 13.1 | [k] | " | 1.7 | " |
| I | 14.2 | yellow | 32 | " | " |
| J | 15.3 | " | " | " | " |
| K | 15.3 | " | 31 | 1.7 | " |
| L | 12.7 | brown | 30 | 1.7 | Invention[i] [j] |
| M | 15.3 | gray | 33 | " | " |
| N | 13.0 | [k] | 32 | 1.1 | Invention[j] |

Notes:
[a] Titanium isopropoxide unless indicated otherwise.
[b] n-amyl-sec-butylmagnesium unless indicated otherwise.
[c] Metal tetrachloride is titanium tetrachloride unless indicated otherwise.
[d] A dash signifies not applicable.
[e] Added 1 ml methanol 30 minutes after MgR$_2$.
[f] Used Zr(n-OC$_4$H$_9$)$_4$ · n-butanol (1:1 molar) in place of Ti(OR)$_4$, 2.5 ml, density ≃ 1.05–1.08, avg-1.065 g/ml.
[g] Used ethylaluminum sesquichloride in place of MX$_4$.
[h] Used SiCl$_4$ in place of TiCl$_4$.
[i] Ti(OR)$_4$ is Ti(OC$_2$H$_5$)$_4$.
[j] MgR$_2$ is n-butyl-sec-butylmagnesium.
[k] Not recorded.
[l] Davison Chemical, Div. of W. R. Grace & Co., Baltimore, MD

Example 2—Ethylene Polymerization

A 3.8 liter, stirred, stainless steel reactor was employed in each run. It was conditioned for each run by charging it with about 3 liters of dry n-heptane, closing the port, and heating the reactor and contents at 175° C. for 30 minutes. The reactor was drained and residual heptane purged with dry nitrogen. The reactor was then closed and cooled under nitrogen pressure to room temperature.

The conditioned reactor was purged with dry isobutane vapor and 3 ml of cocatalyst solution containing 15 wt. % triethylaluminum (TEA) in dry n-heptane (2.8 mmoles TEA) was charged to it. The catalyst was added, the reactor closed, about 2 liters of dry isobutane charged, the reactor and contents were heated to about productivity which is expressed in terms of grams polyethylene per gram catalyst per hour.

One run was conducted at 100° C. for one hour employing an ethylene partial pressure of about 0.90 MPa (145 psia) and a hydrogen partial pressure of about 0.17 MPa (40 psia). Ethylene is admitted as required during polymerization to maintain the desired pressure. All other runs were conducted at 80° C. for 1 hour in the absence of hydrogen by employing an ethylene partial pressure of about 0.69 MPa (115 psia).

The quantity of each catalyst employed, mole ratios employed, and results obtained are shown in Table 2.

TABLE 2

ETHYLENE POLYMERIZATION

| Run No. | Catalyst No. | g | Wt. Ratio Cocat./Cat. | Polymer g | Calculated Productivity g/g | Remarks |
|---|---|---|---|---|---|---|
| 1 | A | 0.1360 | 2.0 | 13.0 | 95.6 | Control |
| 2 | B | .0606 | 5.3 | 100 | 1650 | " |
| 3 | B | .0603 | 5.3 | 36 | 600 | Control[a] |
| 4 | C | .0585 | 5.5 | 54 | 920 | " |
| 5 | D | .0430 | 7.4 | 31 | 720 | " |
| 6 | E | .0633 | 5.0 | 91 | 1440 | " |
| 7 | F | .0561 | 5.7 | 98 | 1750 | Invention |
| 8 | G | .0472 | 6.8 | 83 | 1760 | " |
| 9 | H | .0647 | 4.9 | 261 | 4030 (22,100)[b] | " |
| 10 | I | .0587 | 5.4 | 208 | 3540 | " |
| 11 | J | .0613 | 5.2 | 170 | 2770 | " |
| 12 | K | .0578 | 5.5 | 128 | 2210 | " |
| 13 | L | .0581 | 5.5 | 115 | 1980 | " |
| 14 | M | .0621 | 5.1 | 123 | 1980 | " |
| 15 | N | .0470 | 6.8 | 177 | 3760 | " |

Notes:

[a]100° C. reaction temp., ethylene partial pressure is 1 MPa (145 psia), hydrogen partial pressure is 0.28 MPa (40 psia). Polymer melt index is 0.5. High load melt index to melt index is 38.

[b]Calculated catalyst composition and calculated residuals in the polymer assuming no alkoxide groups removed by the washing procedures and that product weight less silica less Ti(OR)$_4$ weight equals weight of TiCl$_4$ in the catalyst.

| Catalyst Wt. % Components | Polymer Residuals, ppm |
|---|---|
| Ti - 3.4 | 8.5 |
| Cl - 4.0 | 9.8 |
| Mg - 0.8 | 1.9 |
| Silica - 81.7 | 200 |

The calculated productivity of the components minus the silica can be determined by multiplying catalyst weight by 18.3% to obtain 0.01180 and dividing polymer weight by this figure to obtain 22,100 g polyethylene per g catalyst per hour.

The results given in Table 2 indicate that the invention catalysts of runs 7–15 provide some improvement in polymer productivity (runs 7, 8) to marked improvement in polymer productivity (runs 9, 10, 11, 15) relative to the control catalysts. Productivities tended to increase with silica calcination temperatures up to about 704° C. which suggests that the productivity is dependent on the concentration of surface silanol groups. Pertinent runs showing this listed in order of ascending silica calcination temperature in parentheses are 12 (204° C.), 11 (371° C.), 10 (538° C.), 9 (704° C.), 14 (871° C.).

The catalyst used in control run 1 (catalyst A) was prepared in the absence of dialkyl magnesium. The productivity value of about 96 is very low in comparison to the productivity value of about 1760 obtained in invention run 8 (catalyst G). Catalyst G was prepared in the presence of dialkyl magnesium. The catalyst used in control runs 2, 3 (catalyst B) was prepared by reacting dialkyl magnesium directly with silica which was followed by a methanol treatment and then a titanium tetrachloride treatment. The productivity value of about 1650 for control run 2 indicates a relatively active catalyst was prepared, almost as active as several of the less active invention catalysts. Run 3 was made to determine if unusual shear responses might be obtained with the control catalyst. However, the melt index of the polymer was 0.5. The ratio of high load melt index to melt index was 38 indicating that a normal shear response was obtained for this polymer at the melt index found. Melt index is determined in accordance with ASTM D 1238-65T, condition E. High load melt index is determined in accordance with ASTM D 1238-65T, condition F. A high ratio is believed to indicate that a broad molecular weight distribution polymer is made and a low ratio conversely indicates that a narrow molecular weight distribution polymer is made. In control run 4 (catalyst C), a zirconium tetra n-butoxide-n-butanol complex was substituted for the titanium isopropoxide used in invention run 9 (catalyst G) with considerable loss in productivity as the values 920 relative to 4030 clearly show. Control run 5 (catalyst D) and control run 6 (catalyst E) show the effects of substituted ethylaluminum sesquichloride or silicon tetrachloride for the titanium tetrachloride treatment. The productivities obtained, 720 and 1440, indicate relatively active catalysts were prepared but were considered to be too low for further interest.

Relative to control runs 1–6, invention runs 7–15 employing invention catalysts show polymer productivities ranging from a modest improvement, runs 7 and 8 with values of about 1750 to a marked improvement (runs 9, 10, 11, 15) with respective values of 4030, 3540, 2770 and 3760. The importance of silica calcination temperatures upon productivities of catalysts derived from them are exemplified in invention runs 9, 10, 11, 12 and 14. In order of ascending calcination temperature the corresponding productivity values are as follows: Run 12, 204° C. temperature, 2210 productivity; run 11, 371° C. temperature, 2770 productivity; run 10, 538° C. temperature, 3540 productivity; run 9, 704° C. temperature, 4030 productivity; and run 14, 871° C., 1980 productivity. The decrease in catalyst activity noted in run 14 compared to run 9 suggests that it could be associated with lower surface areas caused by high temperature sintering of the silica.

In view of other higher productivity catalyst systems based on grams of product produced per gram of catalyst, there would appear to be little interest in the relatively low productivity catalysts of this invention. However, an object of high productivity is to minimize unwanted catalyst residuals such as titanium and chloride in the polymer and thus avoid a purification step to remove or reduce them. This has been accomplished with the silica supported invention catalysts as exemplified by the results in run 9 and footnote b of Table 2. The values indicate very small Ti, Mg and chloride residuals are present. The silica remaining is basically inert and will not have a detrimental effect on polymer properties.

I claim:

1. A catalyst for the polymerization of olefins consisting essentially of two components wherein component A is formed in an inert hydrocarbon diluent by (1) reacting a silicon-containing finely divided solid in which the silica content ranges from about 80–100 weight percent with a tetravalent titanium alkoxide compound in which the alkyl group of the alkoxide contains from 1 to about 12 carbon atoms;

(2) contacting the product obtained in step (1) with an organomagnesium compound wherein the organo portion is a hydrocarbyl group of 1 to about 12 carbon atoms; and (3) treating the product obtained in step (2) with a titanium tetrahalide; and component B is a metallic hydride or organometallic compound wherein said metal is selected from a metal of Groups IA, IIA, and IIIA of the Periodic Table.

2. A catalyst according to claim 1 wherein the mole ratio of silica to tetravalent titanium compound in step (1) ranges from 5:1 to 100:1, the mole ratio of initial tetravalent titanium compound in step (1) to organometal compound in step (2) ranges from about 0.5:1 to about 25:1 and the mole ratio of titanium tetrahalide added in step (3) to the combined moles of components of step (2) ranges from about 100:1 to about 1:1.

3. A catalyst according to claim 1 wherein said titanium tetrahalide in step (3) is titanium tetrachloride.

4. A catalyst according to claim 1 wherein component A is formed by
(1) reacting silica with titanium tetraisopropoxide or titanium tetraethoxide;
(2) contacting the product of step (1) with n-butyl, sec-butyl magnesium or n-amyl-sec-butylmagnesium and
(3) reacting the product of step (2) with titanium tetrachloride and component B is triethylaluminum.

5. A catalyst according to claim 1 wherein the mole ratio of silica to tetravalent titanium compound in step (1) ranges from about 10:1 to about 75:1, the mole ratio of initial tetravalent titanium compound in step (1) to organometal compound in step (2) ranges from about 1:1 to about 15:1 and the mole ratio of titanium tetrahalide added in step (3) to the combined moles of components of step (2) ranges from about 10:1 to about 1:1.

6. A method of preparation of a polymerization catalyst which comprises forming a component A by sequentially reacting in an inert hydrocarbon diluent
(1) a silicon-containing finely divided inorganic solid in which the silica content ranges from about 80 to 100 weight percent;
(2) at least one tetravalent titanium alkoxide compound in which the alkyl group of the alkoxide contains from 1 to about 12 carbon atoms;
(3) an organomagnesium compound wherein the organo portion is a hydrocarbyl group of 1 to about 12 carbons; and
(4) a titanium tetrahalide; and then combining component A with component B which is a metallic hydride or organometallic compound wherein said metal is selected from a metal of Groups IA, IIA, and IIIA of the Periodic Table.

7. A method according to claim 6 wherein the final product is washed with an inert solvent to remove unreacted titanium compound prior to combining with component B.

8. A method according to claim 6 wherein the reactants are contacted under refluxing conditions.

9. A method according to claim 6 wherein component A is formed by the steps of
(1) reacting a silicon-containing finely divided solid in which the silica content ranges from about 80–100 weight percent with a tetravalent titanium alkoxide compound in which the alkyl group of the alkoxide contains from 1 to about 12 carbon atoms;
(2) contacting the product obtained in step (1) with an organomagnesium compound wherein the organo portion is a hydrocarbyl group of 1 to about 12 carbon atoms; and
(3) treating the product obtained in step (2) with a titanium tetrahlide.

10. A method according to claim 9 wherein the product of step (3) is washed with an inert solvent to remove unreacted titanium compound prior to combining with component B.

11. A method according to claim 6 wherein said titanium tetrahalide in step (3) is titanium tetrachloride.

12. A process for the polymerization of olefins which comprises contacting at least one aliphatic 1-olefin with a catalyst as defined in claim 1 under polymerization conditions.

13. A process according to claim 12 wherein the olefin is ethylene.

14. A process for the polymerization of olefins which comprises contacting at least one aliphatic 1-olefin with a catalyst as defined in claim 4 under polymerization conditions.

15. A process according to claim 14 wherein the olefin is ethylene.

* * * * *